United States Patent

Kaycee et al.

[11] Patent Number: 6,085,245
[45] Date of Patent: Jul. 4, 2000

[54] SYSTEM AND METHOD FOR THE IMPLICIT SUPPORT OF IP SUBNETWORKS

[75] Inventors: Mahendra Kaycee, Freehold, N.J.; Ken Martinez, Tampa, Fla.; Michelle Martinez, Clearwater, Fla.; Sue Alfano, Lakeland, Fla.; Rocco Sansone, Seminole, Fla.

[73] Assignee: Paradyne Corporation, Largo, Fla.

[21] Appl. No.: 08/922,722

[22] Filed: Jul. 24, 1997

Related U.S. Application Data

[60] Provisional application No. 60/045,443, May 2, 1997.

[51] Int. Cl.[7] .................................................... G06F 11/30
[52] U.S. Cl. ........................ 709/224; 709/220; 709/223; 709/238; 709/245; 709/249
[58] Field of Search ............................ 395/200.5, 200.54, 395/200.53, 200.68, 200.75, 200.79; 709/224, 220, 223, 238, 245, 249

[56] References Cited

U.S. PATENT DOCUMENTS

| | | | |
|---|---|---|---|
| 5,802,146 | 9/1998 | Dulman | 379/34 |
| 5,812,552 | 9/1998 | Arora et al. | 370/401 |
| 5,819,033 | 10/1998 | Caccavale | 395/200.11 |

*Primary Examiner*—Zarni Maung
*Assistant Examiner*—Saleh Najjar
*Attorney, Agent, or Firm*—Thomas, Kayden, Horstemeyer & Risley

[57] ABSTRACT

A digital subscriber line (DSL) remote terminal unit (RTU) using a plurality of forwarding policies and a management information base (MIB) allows the implicit support of IP subnetworks by creating dynamically, the routing tables necessary for IP subnetwork addressing. By using a constructed enterprise DSL ipInjection MIB to define a plurality of objects that describe the creation and management of a plurality of IP subnetworks the present invention allows the creation and support of both contiguous IP subnetworks and discontiguous IP subnetworks.

14 Claims, 3 Drawing Sheets

SYSTEM AND METHOD FOR THE IMPLICIT SUPPORT OF IP SUBNETWORKS

CROSS REFERENCE TO RELATED APPLICATION

This document claims priority to and the benefit of the filing date of copending provisional application entitled A METHOD AND APPARATUS FOR THE IMPLICIT SUPPORT OF IP SUBNETS IN A DSL REMOTE SUBSCRIBER UNIT, assigned Ser. No. 60/045,443, and filed May 2, 1997, which is pending and is hereby incorporated by reference.

FIELD OF THE INVENTION

The present invention relates generally to communication system management, and more specifically, to a system and method which allows for the implicit support of Internet Protocol (IP) subnetworks by creating dynamically a routing table for supporting IP subnetworks. In addition, object data pertaining to the subnetwork is collected, and an associated enterprise management information base (MIB) for storing object data in accordance with a specified MIB architecture is employed. The MIB operates in cooperation with a series of forwarding policies within the operating system of a digital subscriber line (DSL) device to create dynamically a routing table which defines the IP subnetwork.

BACKGROUND OF THE INVENTION

The Internet community assigns blocks of Internet addresses to various corporations. These corporations include Internet service providers (ISP's) who buy large blocks of Internet addresses to deploy to their users. IP networks can be subdivided into IP subnetworks. The use of IP subnetworks allows the partitioning of Internet transported information, or traffic, to certain subsets of users. By associating the subsets of users with individual subnetwork addresses, it is possible to send traffic to only that group of users defined for a particular subnetwork, using a single IP subnetwork address. For example, in a corporate environment where it is desirable to have different groups and subgroups of users that receive different levels of information, it is possible to have an entire group of users partitioned for a particular level or type of information, and simultaneously have a subset of that group partitioned for a different level of information. By implementing a policy based system for the routing of network traffic, it is possible to define multiple IP subnetworks.

Currently, IP subnetworks are configured manually. Using network management, as known in the art, a router is configured manually, a priori with subnetwork address information. In order to extend connectivity among multiple IP subnetworks, a subnetwork acts as a connection point between the other subnetworks, thus requiring complex routing protocols. Additionally, if a remote station is dynamically IP addressed, for example, through the use of the well known dynamic host configuration protocol (DHCP), the only way to route information to it is by having the IP subnetwork preconfigured as discussed above. Current router engines build router tables defining the address location for the various networks. Many of these router tables support the use of subnetworks; however, the tables are manually configured as subnetworks, and special policies are defined within the router in order to use the subnetworks. This presents many configuration problems and requires manual configuration. The present invention addresses the problems associated with manual configuration of static routing tables to provide support of IP subnetworks by making the creation of the routing tables an adaptive dynamic process.

The Internet community has defined an organizational framework of data, which provides a naming authority allowing any company or group to define information within the framework in a way that allows any or all of this data to coexist. Under the control of the International Telecommunications Union (ITU) and the International Standards Organization (ISO), the organizational framework has been constructed as a tree. The root of the tree is managed by the ITU and the ISO. Branches extending from the tree may be assigned to other organizations for defining the child branches for that branch. A MIB is a distributed database that describes a set of items that management applications and agents use to report and control managed devices. Management applications can include, but are not limited to configuration, discovery, and topology managers. The MIB of the present invention is a configuration MIB. A DSL remote terminal unit (RTU) can be one of these managed devices. The RTU employs the IP Injection MIB to create dynamically the routing tables in accordance with the established forwarding policies which will be described in detail hereafter.

A MIB begins with a line naming the MIB. The name of the MIB is followed by an import statement which allows the definition of other MIB's that may be incorporated into the MIB being defined. These import statements are typically called Requests for Comments (RFC's). Each RFC is assigned a unique number that identifies the document. For example, RFC1212 defines the formal grammar for a Simple Network Management Protocol (SNMP) MIB. SNMP is a widely used protocol that enables interoperable network management. The SNMP protocol defines a set of commands that a management application may use to retrieve or change the value of items that a management agent is making available.

Within the MIB is a structure for organizing managed items. The structure is formed by defining a group or groups of related pieces of information. A group is defined by naming it and showing how it fits into an inherence tree. Groups may contain information in the form of items or "objects", subgroups, or a combination of the two. Each subgroup is configured like a group.

Within a group, data can be organized in one of two methods. A scalar item is a single piece of information within a group. A table is a structure for organizing data that requires more information to uniquely identify a single data item within a group of similar items.

Each item, whether scalar or part of a table, defined in a MIB includes a description which defines the item. Typically, the description includes SYNTAX, ACCESS, STATUS and DESCRIPTION clauses. The SYNTAX clause specifies the type of information which the item contains. Information types typically specified by the SYNTAX clause include INTEGER, OCTET STRING, Counter and DisplayString. INTEGER specifies that the value of the item should be interpreted as a number. OCTET STRING specifies that the value of the item should be interpreted as a string of octets, each having a value between 0 and 255. Counter specifies that the item is an INTEGER that has an implied range of zero to FFFFFFFF. DisplayString specifies that the item is an OCTET STRING where each octet is restricted to a printable ASCII character.

The ACCESS clause specifies the ways the item may be used and shows the actions which the agent may support for the item. ACCESS may be read-only, read-write or not-accessible. "Read-only" means that the value of the item management application but may not be altered. "Read-write" means that the item may be read and/or altered by a management application. "Not-accessible" is given as the access for organizational constructs that do not represent data items. Not-accessible is used only for table features and should not be used for a scalar item. The STATUS clause specifies whether the item is required for an agent that supports the defined group. A STATUS of mandatory means that the item will always be present if the defined group is supported by the agent. A STATUS of optional means that a particular implementation has the option of supporting the item. The DESCRIPTION clause contains a double quote delimited text description of the item. Finally, the item definition ends by specifying how the item fits into the MIB tree. The group the item belongs to is given, followed by the unique branch number within the group for the item.

Organizing a table requires the use of two additional operators, the SEQUENCE operator and the SEQUENCE OF operator. The SEQUENCE operator allows the definition of a new type that consists of several standard types in a specific order. The SEQUENCE OF operator allows the definition of a list of zero or more of the same type of elements. A table is formed by defining a SEQUENCE, typically called a table entry. A table is defined as a SEQUENCE OF the table entry type. As there is no data that is uniquely referred to by the name of the table or entry, the STATUS of the table and the table entry is not-accessible. The INDEX clause specifies the items that can be used to uniquely identify an element in the table.

SUMMARY OF THE INVENTION

The present invention provides a system and method for implicitly supporting a plurality of Internet Protocol (IP) subnetworks in a digital subscriber line (DSL) environment. The operating specification of the DSL remote terminal unit includes a plurality of forwarding policies. These forwarding policies in cooperation with a management information base (MIB), specifically an IP injection MIB, allow for the dynamic creation of IP routing tables that enable a plurality of IP subnetworks to be supported from a single DSL RTU. Forwarding policies are steps or instructions that are part of the operating specification of the DSL device in which the subnetwork is created and managed. In the preferred embodiment disclosed herein, the forwarding policies are included in the operating specification of the DSL RTU, because in the preferred embodiment, the DSL RTU dynamically creates the subnetwork. In addition, the MIB that cooperates with the forwarding policies resides in the DSL RTU. However, it should be noted that the concepts and features of the present invention can be practiced with forwarding policies and MIB's that reside elsewhere in a DSL network. For example, the forwarding policies and MIB that are used in the present invention to support implicitly multiple IP subnetworks may reside in a DSL device located at the telephone company central office, or another location.

The forwarding policies determine the route that various traffic must follow. For example, in the preferred embodiment, forwarding policy #1 requires that upstream packets (i.e., packets flowing from the RTU to the central office) addressed to the network access provider (NAP) domain IP or service domain IP are queued for local delivery. Each forwarding policy will be described in detail hereafter.

The present invention supports both contiguous subnetworks, where multiple users in a particular subnetwork are located at the same remote location, and discontiguous subnetworks, where multiple users in a particular subnetwork are located at different locations. Discontiguous subnetworks are physically disconnected, but logically connected, i.e., multiple users on the same subnetwork at different locations. The present invention allows discontiguous multiple users to share the same subnetwork as if the users were co-located.

The MIB of the present invention is run by a management application running on a management station. In order to create dynamically the routing tables necessary to implicitly support multiple IP subnetworks, a plurality of forwarding policies, resident in the DSL RTU operating specification are executed in cooperation with the MIB of the present invention. The operation of the MIB includes collecting a plurality of objects describing at least one of the plurality of IP subnetworks and assembling the plurality of objects into a management information base (MIB). A MIB table is then configured. Once the MIB table is configured, the forwarding policies take the information in the IP injection MIB and create a routing table. The routing table is created dynamically by combining the MIB with the forwarding policies, which enables the creation of at least one IP subnetwork by defining dynamically the DSL RTU's to be included in the subnetwork. The MIB also allows a management station to manage the IP subnetworks by monitoring performance of the IP subnetworks.

The MIB of the present invention resides within the DSL RTU and is used to configure dynamically the IP subnetwork by injecting a set of IP addresses. The IP subnetwork support is said to be implicit because all that is necessary is to design the network addressing and configure the subnetwork one time.

The enterprise DSL ipInjection MIB of the present invention is a single level MIB containing no child groups and operates within a management framework used to manage access networks based around DSL interfaces and devices. The network typically includes DSL RTU's, which allow end users to connect to the network. A typical end user can be a networked computer workstation, or a residential computer in home use. The network, for example, can be the Internet, a corporate network, or any other data communications network. A DSL RTU can be either resident inside a personal computer (PC) or be a stand alone device connected to a user's PC via some communications interface, for example, an Ethernet connection.

DSL RTU's, connect across the local telephone loop by using physical and link level DSL protocols. One or more such DSL RTU connects to a DSL access concentrator device, which resides within a telephone company's central office. The DSL access concentrator device multiplexes data from multiple DSL RTU's, all of which may reside at different physical locations. One or more DSL access concentrator devices are connected to a network, which provides end user access to various networked services.

In the preferred embodiment the enterprise DSL ipInjection MIB structure resides on each DSL RTU. In order to acquire DSL specific information, a management station exchanges SNMP messages with an SNMP agent on the corresponding DSL access concentrator device. An SNMP subagent on the DSL access concentrator device uses the DSL ipInjection MIB in order to perform control functions. The SNMP agent accesses the ipInjection MIB structure on behalf of the management station and performs applicable information gathering and control actions. The management station exchanges SNMP messages with the SNMP agent in the RTU.

The invention has numerous advantages, a few of which are indicated hereafter, as examples.

An advantage of the present invention is that it allows for the implicit support of IP subnetworks by allowing the one time configuration of subnetworks during network addressing.

Another advantage of the present invention is that it allows for the implicit support of discontiguous IP subnetworks.

Another advantage of the present invention is that it allows for the implicit support of contiguous IP subnetworks.

Another advantage of the present invention is that it eliminates the need to preconfigure in a router the IP subnetwork.

Another advantage of the present invention is that it eliminates the need to employ complex routing protocols.

Another advantage of the present invention is that allows the dynamic programming of routes automatically.

Another advantage of the present invention is that it allows the implicit support of multiple IP subnetworks.

Another advantage of the present invention is that it allows the adaptive addition and deletion of DSL remote terminal units, thus allowing a high degree of scalability in network configuration.

Another advantage of the present invention is that it allows the addition and deletion of individual DSL remote terminal units.

Other features and advantages of the present invention will become apparent to one of skill in the art upon review of the following drawings and the detailed description of the preferred embodiment.

BRIEF DESCRIPTION OF THE DRAWINGS

The present invention can be better understood with reference to the following drawings. The drawings are not necessarily to scale, emphasis instead being placed on clearly illustrating principles of the present invention.

DETAILED DESCRIPTION OF THE PREFERRED EMBODIMENT

Figure 1:
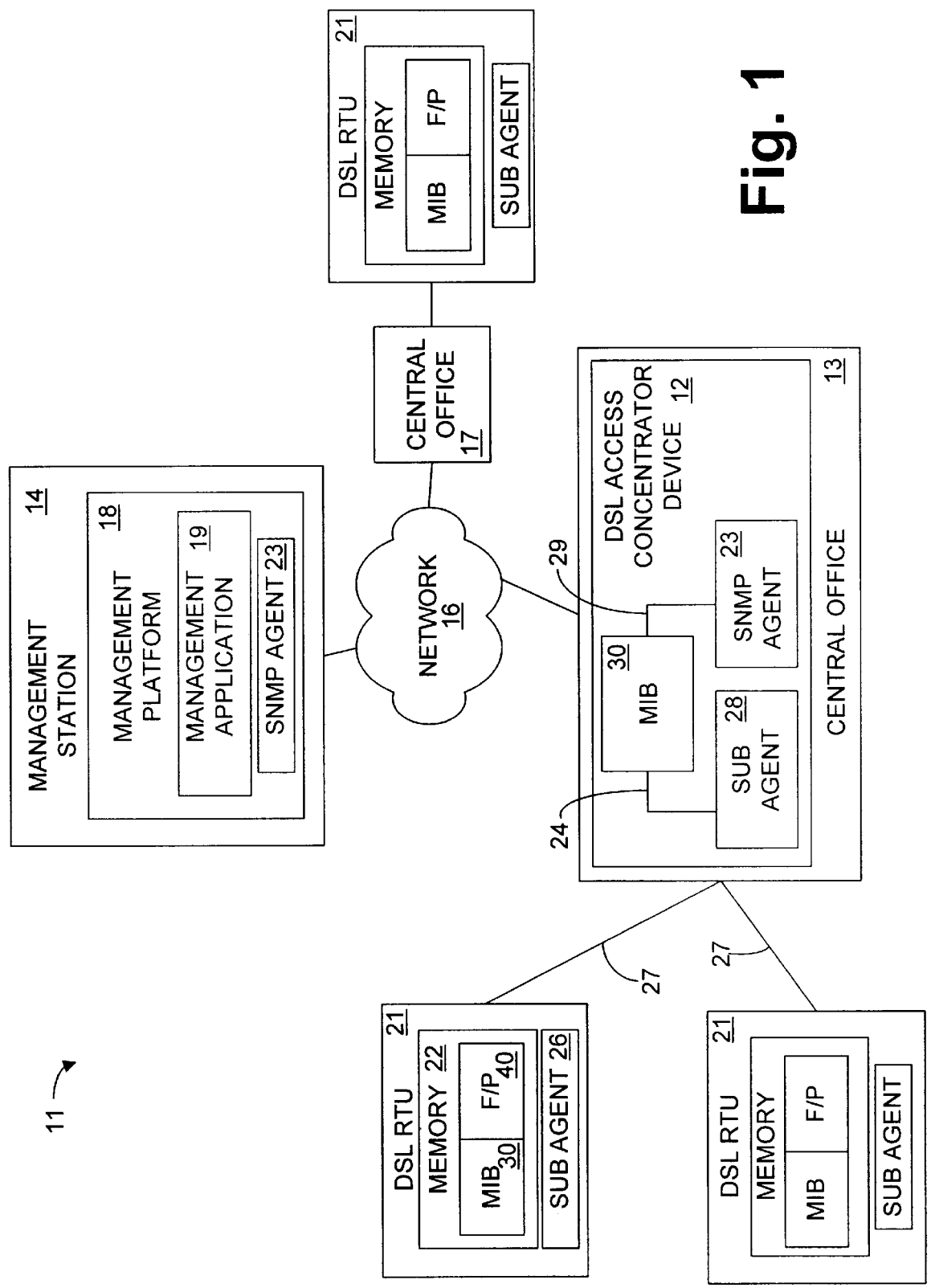
FIG. 1 is a block diagram illustrating a network topography containing a plurality of digital subscriber line (DSL) remote terminal units (RTU's) and associated management system.

With reference now to the figures wherein like reference numerals designate corresponding parts throughout the several views, FIG. 1 is a block diagram illustrating a network topography containing a plurality of digital subscriber line remote terminal units and associated management system of the present invention.

The management system includes at least one digital subscriber line (DSL) remote terminal unit (RTU) 21 to be managed by management station 14, through network 16 by DSL access concentrator device 12 located at central office 13.

Management station 14 can be, for example but not limited to, a personal computer or a networked workstation.

For simplicity, only one digital subscriber line access concentrator device will be shown and discussed, however, a plurality of DSL access concentrator devices may reside at each central office location. Similarly, only three DSL RTU's are shown, however, the network may contain many devices which can be integrated into the subnetworks created by the present invention.

Central office location 17 contains all of the elements of central office location 13, however, they have been omitted from FIG. 1 for simplicity. DSL RTU 21 contains memory 22. Memory 22 contains the enterprise DSL ipInjection MIB 30 and forwarding policies 40 of the present invention. DSL RTU 21 also contains subagent 26 for interfacing with SNMP agent 23 on management platform 18. Network 16 can be, for example, an Ethernet or Token Ring type network, a local area network (LAN), a wide area network (WAN), or a collection of LAN's and WAN's.

Installed at management station 14 is software having a management platform 18, which runs a management application 19. Management platform 18 also contains SNMP agent 23. Management platform 18 can be, for example, but not limited to, Microsoft Windows operating system. Once launched, management application 19 allows for the configuration of RTU 21 by means of SNMP messages passing through DSL access concentrator device 12 to subagent 26 on RTU 21. Management application 19, SNMP agent 23 and subagent 26 communicate over network 16 using management application protocols within the TCP/IP protocol suite, preferably the Simple Network Management Protocol (SNMP). RTU 21 instruments, through the execution of software logic, the DSL ipInjection MIB 30 and forwarding policies 40 that are used to create dynamically the routing tables. The routing tables support implicitly IP subnetworking by virtue of the forwarding policies 40 specified. Forwarding policies 40 will be described in detail hereafter. SNMP agent 23 collects information about DSL RTU 21, that information used to form the enterprise DSL ipInjection MIB 30 of the present invention, and provides that information to a network administrator physically located at management station 14. The management information provided to the network administrator enables the implicit support of IP subnetworks.

Connected to DSL access concentrator device 12 through DSL interface 27 is DSL RTU 21. DSL RTU 21 provides end user connectivity to the remote user location. For simplicity, only three DSL RTU's 21 are shown in FIG. 1, however many more DSL RTU's can be connected to DSL access concentrator device 12.

In order to facilitate the implicit support of IP subnetworks across DSL interface 27, the forwarding policies 40 and enterprise DSL ipInjection MIB 30 of the present invention reside in each DSL RTU 21. RTU 21, by using information configured by DSL ipInjection MIB 30 in conjunction with forwarding policies 40, creates dynamically the routing tables used for information forwarding. SNMP messages are exchanged between management application 19 and subagent 26 on RTU 21 for purposes of configuration and monitoring. In addition, DSL access concentrator device 12 is capable of acting as a subagent by using the DSL ipInjection MIB 30 of the present invention to configure dynamically the information in RTU 21 as well.

Residing on DSL RTU 21 is sub agent 26, which is used to communicate with sub agent 28 located on DSL access concentrator device 12, in order to provide information about DSL RTU 21 to management station 14.

Forwarding Policies

Contained within memory 22 are a series of forwarding policies 40. Forwarding policies are instructions that are part of the operational specification of the particular DSL device. In the preferred embodiment, the forwarding policies of the present invention are part of the DSL RTU operational specification. Specifically, there are four forwarding policies that cooperate with the ipInjection MIB 30 of the present invention that permit the dynamic creation and maintenance of IP subnetworks. Specifically, forwarding policy #1 is as follows. Regarding upstream forwarding, based on successful address resolution having taken place, the RTU must forward the following traffic along its default route (the default route is the path from the DSL RTU to the DSL access concentrator device located at the central office):

not addressed to its network access provider (NAP) Domain IP Address, AND not addressed to any of its Service Domain IP Addresses Upstream (from DSL RTU to central office) packets addressed to the NAP Domain IP or Service Domain IP are queued for local delivery.

Forwarding policy #2 is as follows. The following traffic must be forwarded along its default route in addition to being queued for local delivery:

addressed to its NAP Domain subnet broadcast address, OR addressed to any of its Service Domain subnet broadcast addresses, if such a subnet route is not injected/configured {as a host route}.

Forwarding policy #3 is as follows. The following limited broadcast traffic must be forwarded along its default route:

BootP all other limited broadcast traffic will be queued for local delivery.

Forwarding policy #4 is as follows. Regarding downstream forwarding, if the RTU receives a packet from its default route, but doesn't have a host route for the destination, AND the packet is not destined for the NAP Domain address (queue for local delivery) or one of the configured Service Domain IP addresses (queue for local delivery), the RTU will:

send an Internet Control Message Protocol (ICMP) Destination Unreachable {Host Unreachable} message back to the source and increment the MIB variable ipOutNoRoutes and discard the packets.

Figure 2:
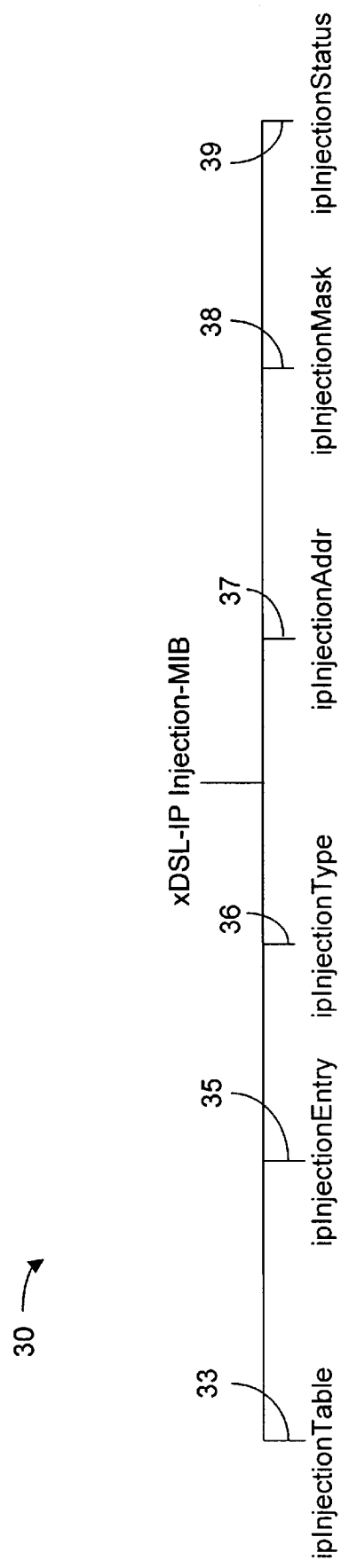
FIG. 2 is an inherence tree illustrating the organization of the enterprise DSL ipInjection MIB used with the digital subscriber line remote terminal unit and associated management system of FIG. 1.

Enterprise DSL ipInjection MIB With reference now to FIG. 2, shown is a tree illustrating the organization of an ipInjection MIB entitled xdsl-ipInjection-MIB 30, used with the digital subscriber line remote terminal unit and associated management system of FIG. 1.

The enterprise MIB xdsl-ipInjection-MIB 30 defines the set of manageable object instances known to SNMP agent 23 of FIG. 1. Management application 19 uses the definition of object instances of enterprise DSL ipInjection MIB xdsl-ipInjection-MIB 30 to manage DSL RTU 21.

The enterprise DSL MIB, xdsl-ipInjection-MIB 30 is defined by the following objects.

The ipInjectionTable object located at branch 33 is used to inject IP address information. This information includes host address information, service provider information and network address provider information. Host address information includes the IP address and subnet mask of the end user host (or PC) attached to RTU 21. In the preferred embodiment, the host address information may also define a SUBNET. Service provider information includes the IP address and subnet mask assigned to RTU 21 in the service provider domain (for example the ISP (Internet Service Provider)). Both the host address information and service provider information are used to effect the flow of USER data through the DSL system.

Network access provider information includes the IP address and subnet mask assigned to RTU 21 in the management domain. This IP address is used to effect the flow of the SNMP traffic from management platform 18 to SNMP agent 26 in RTU 21.

The ipInjectionEntry object located at branch 35 corresponds to an entry in the ipInjectionTable.

The ipInjectionType object located at branch 36 indicates the type of IP address information. These include entering a null, indicating meaningless IP information used to add a row, a nap, indicating network access point information, a serviceProvider, indicating service provider IP information, or a host, indicating host IP information, in the ipInjectionTable. If the OBJECT TYPE is host, a host route can be injected as a destination subnet route, which information is part of the routing table. If the OBJECT TYPE is serviceProvider or NAP, an IP address table is updated. The IP address table configures the interfaces of the router or DSL remote terminal unit.

The IP routing table allows the configuration of the routes within the DSL remote terminal unit.

The ipInjectionAddr object located at branch 37 specifies IP address information for host, service provider domain or network access provider domain as indicated by the ipInjectionType object located at branch 36. If specifying host address, the object would be the IP address of a locally attached host or be an IP address of the form {<Network-Prefix>, 0} to indicate a local subnet or be an IP address of the form {<Network-Prefix>, <all one's>} to indicate the subnet broadcast address for locally attached hosts. If specifying service provider domain address, the object would be the device IP address in the service provider domain. If specifying network address provider (NAP) domain address the object would be the device IP address in the NAP domain.

The ipInjectionMask object located at branch 38 requires that the value of the ipInjectionMask cannot be 0.0.0.0 and only contiguous, left justified masks are allowed. For those systems that do not support arbitrary masks, an agent constructs the value of the ipInjectionMask by determining whether the value of the correspondent ipInjectionAddr field belongs to a class-A, B or C network using one of the following:

| mask | network |
| --- | --- |
| 255.0.0.0 | class-A |
| 255.255 0.0 | class-B |
| 255.255.255.0 | class-C |

A Class A network is defined as one that uses network addresses from 1 to 126, a Class B network is defined as one that uses network addresses from 128 to 191 and a Class C network is defined as one that uses network addresses from 192 to 223.

The ipInjectionStatus object located at branch 39 allows for setting the value of this object to the invalid value (3) which has the effect of invalidating the corresponding entry in the ipInjectionTable object located at branch 33. It is an implementation specific matter as to whether the agent removes an invalidated entry from the table. Accordingly, management station 14 must be prepared to receive tabular information from agents that corresponds to entries not currently in use.

The formal organization of the xdslipInjection MIB 30 is as follows:

```
ipInjectionTable OBJECT-TYPE
    SYNTAX  SEQUENCE OF IpInjectionEntry
    ACCESS  not-accessible
    STATUS  mandatory
    DESCRIPTION
        "This table is used to inject IP Address information.
        This information includes Host Address information,
        Service Provider Address information,
        and Network Access Provider Address information."
    ::= { attp-ipInjection 1}
ipInjectionEntry OBJECT-TYPE
    SYNTAX    IpInjectionEntry
    ACCESS    not-accessible
    STATUS    mandatory
    DESCRIPTION
    "This object corresponds to an entry in the ipInjectionTable"
    INDEX {ipInjectionType,
            ipInjectionAddr,
            ipInjectionMask}
    ::={ ipInjectionTable 1 }
IpInjectionEntry ::=
    SEQUENCE {
        ipInjectionType
            INTEGER,
        ipInjectionAddr
            IpAddress,
        ipInjectionMask
            IpAddress,
        ipInjectionStatus
            INTEGER
    }
ipInjectionType OBJECT-TYPE
    SYNTAX INTEGER {
        null(1),         --null or meaningless IP information
                         used to simplify adding a row.
        nap (2),         --network access point IP information
        serviceProvider(3), --service provider IP information
        host(4)          --host IP information
    }
    ACCESS read-write
    STATUS mandatory
    DESCRIPTION
        "Indicates the type of IP address information whether
        it is null, network access provider (nap), service provider,
        or Host IP address information
        A null row indicates that the information is null or
        meaningless. One example of its use would be for agents
        to add null rows to enable managers, which are not able
        to add new rows but able to edit existing ones, to
        effectively add new rows"
    ::= {ipInjectionEntry 1}
ipInjectionAddr OBJECT-TYPE
    SYNTAX IpAddress
    ACCESS read-write
    STATUS mandatory
    DESCRIPTION
        "The ipInjectionAddr specifies IP Address information
        for Host, Service Provider domain or Network Access
        Provider domain as indicated by the ipInjectionType
        object.
        If specifying Host address, the object would be the IP
        Address of a locally attached host or be an IP Address
        of the form { <Network-Prefix>, 0} to indicate a
        local subnet or be an IP address of the form { <Network-
        Prefix>, <all one's> } to indicate the subnet broadcast
        address for locally attached hosts.
        If specifying Service Provider domain address, the object
        would be the device IP Address in the Service Provider
        domain.
        If specifying Network Access Provider (NAP) domain
        address the object would be the device IP Address in the
        NAP domain
    ::= { ipInjectionEntry 2 }
ipInjectionMask OBJECT-TYPE
    SYNTAX IpAddress
    ACCESS read-write
    STATUS mandatory
    DESCRIPTION
        "The value of the ipInjectionMask cannot be 0.0.0.0
        and only contiguous, left-justified masks are allowed.
        For those systems that do not support arbitrary masks,
        an agent constructs the value of the ipInjectionMask by
        determining whether the value of the correspondent
        ipInjectionAddr field belongs to a class-A, B, or C
        network, and then using one of:
              mask              network
              255.0.0.0         class-A
              255.255.0.0       class-B
              255.255.255.0     class-C"
    ::= {ipInjectionEntry 3 }
ipInjectionStatus OBJECT-TYPE
    SYNTAX INTEGER {
        static(1),    -- a statically assigned entry
        dynamic(2)    -- a dynamically assigned entry
        invalid(3)    -- an invalidated entry
    }
    ACCESS read-write
    STATUS mandatory
    DESCRIPTION
        "Setting this object to the value invalid(3) has the effect
        of invalidating the corresponding entry in the
        ipInjectionTable object.
        It is an implementation-specific matter as to whether the
        agent removes an invalidated entry from the table.
        Accordingly, management stations must be prepared to
        receive tabular information from agents that corresponds
        to entries not currently in use."
    ::= { ipInjectionEntry 4 }
```

Figure 3:
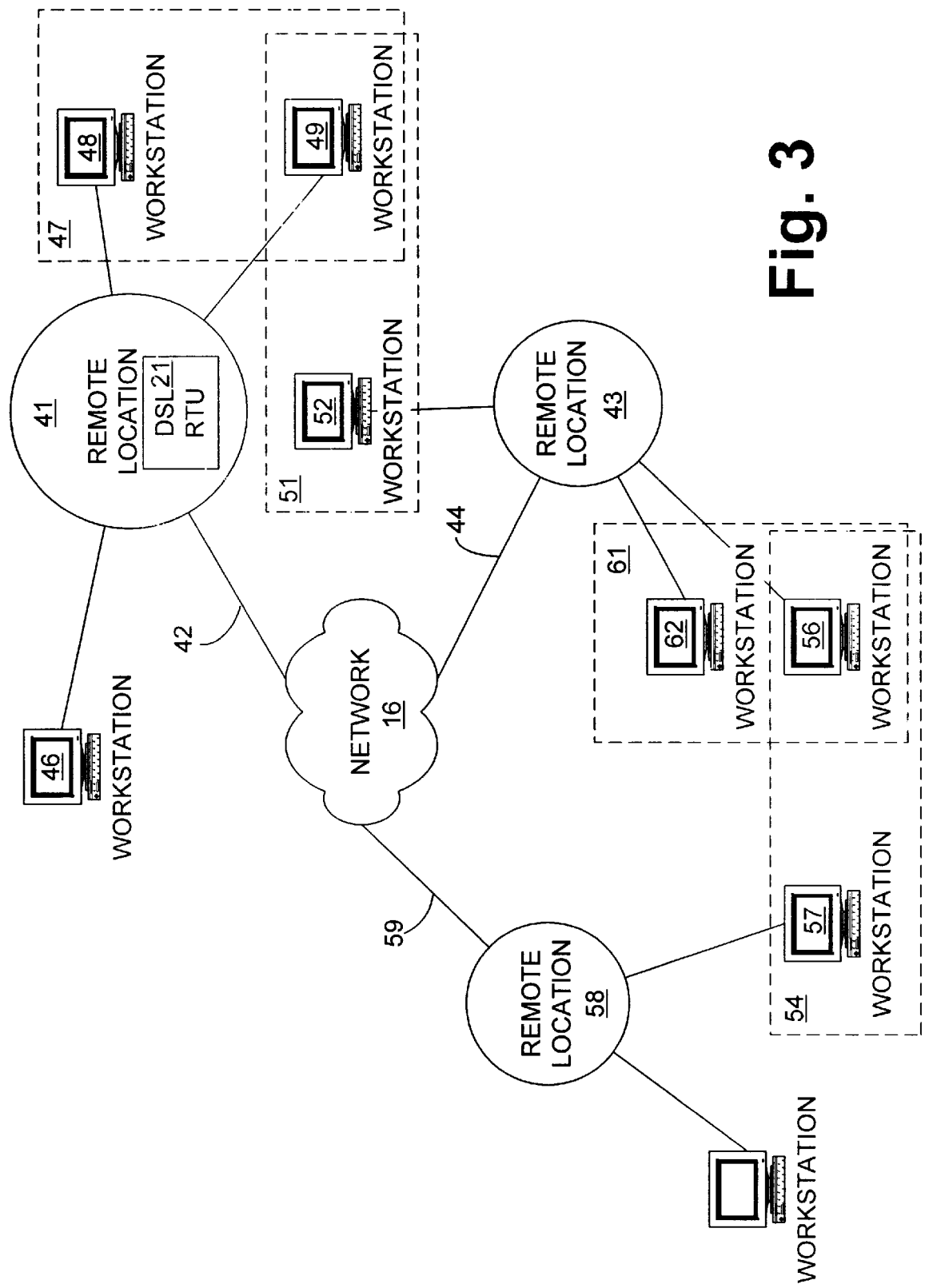
FIG. 3 is a view illustrating the IP subnetworks that are possible using the DSL RTU's of FIG. 1 and the enterprise DSL ipInjection MIB of FIG. 2.

Referring now to FIG. 3, shown is a view depicting illustrative IP subnetwork partitioning made possible by employing the MIB and forwarding policies in the DSL RTU 21 of FIGS. 1 and 2. Remote locations 41, 43 and 58 are connected to network 16 via DSL interfaces 42, 44 and 59, respectively. For clarity, the central office connection has been omitted from FIG. 3. A DSL RTU 21 resides at each remote location 41, 43 and 58, and terminates each DSL interface 42, 44 and 59, respectively, each remote location being representative of a typical application. Each workstation connects to DSL RTU 21 in each remote location. For clarity, however, the DSL RTU 21 has been omitted from the depiction of remote locations 43 and 58. Each workstation connects to DSL RTU 21 located at each remote location. DSL RTU 21 contains enterprise DSL ipInjection MIB 30 and forwarding policies 40 designed to enable the dynamic creation of multiple IP subnetworks.

IP subnetwork 47, which includes workstations 48 and 49 is an example of a contiguous subnetwork in that both remote units are co-located at remote location 41. Similarly, IP subnetwork 61, which includes workstations 56 and 62 is another example of a contiguous subnetwork located at remote location 43. IP subnetwork 51, which includes workstation 49 and workstation 52, is an example of a discontiguous subnetwork in that both workstations are located at different remote locations. Both workstations 49 and 52, however, are part of the same logical IP subnetwork, i.e., IP subnetwork 51. Similarly, IP subnetwork 54, which includes workstations 56 and 57 is another example of a discontiguous subnetwork in that both workstations are located at different remote locations.

The present invention also allows a workstation, such as workstation 46 to function as a stand alone station, i.e., separate from IP subnetwork 47 while still remaining connected to remote location 41. While the foregoing is illustrated using only a small quantity of DSL RTU's, the present invention contemplates much larger subnetworks including many individual remote units.

The elements of the enterprise DSL ipInjection MIB and forwarding policies, as described previously, can be implemented in software, firmware, hardware, or a combination thereof.

When implemented in software, the MIB can be stored and transported on any computer readable medium for use by or in connection with a computer-related system or method. In the context of this document, a computer readable medium is an electronic, magnetic, optical, or other physical device or means that can contain or store a computer program for use by or in connection with a computer-related system or method.

Thus, there has been described and illustrated herein a system and method for the implicit support of IP subnetworks using a DSL remote terminal unit having a series of forwarding policies and a management system and MIB which provides significantly enhanced capabilities in creating and managing IP subnetworks in a DSL RTU.

It is to be understood that the foregoing is descriptive of an illustrative, preferred embodiment of the invention. Numerous variations or changes may occur to those skilled in the art without departure from the spirit and scope of the invention.

The following is claimed:

1. A system for implicitly supporting a plurality of contiguous and discontiguous Internet Protocol (IP) subnetworks using a plurality of forwarding policies and a management application running on a management station, comprising:

means for collecting a plurality of objects describing at least one of said plurality of IP subnetworks;

means for assembling said plurality of objects describing said at least one of said plurality of IP subnetworks into a management information base (MIB), said MIB cooperating with said plurality of forwarding policies;

means for forming said at least one of said plurality of IP subnetworks by dynamically creating a routing table using said MIB and said forwarding policies; and means for managing said at least one of said plurality of IP subnetworks from said management station using said assembled MIB and said plurality of forwarding policies by monitoring performance of said at least one of said plurality subnetworks.

2. The system of claim 1, wherein said MIB resides in a digital subscriber line (DSL) remote terminal unit.

3. The system of claim 1, wherein said MIB resides in a digital subscriber line (DSL) central office unit.

4. The system of claim 1, wherein said means for forming said at least one of said plurality of IP subnetworks is performed automatically from a central office location to a plurality of DSL remote terminal units.

5. The system of claim 1, wherein said means for forming said at least one of said plurality of IP subnetworks by creating a routing table further includes means for updating an IP address table.

6. A method for implicitly supporting a plurality of contiguous and discontiguous Internet Protocol (IP) subnetworks using a plurality of forwarding policies and a management application running on a management station, comprising the steps of:

collecting a plurality of objects describing at least one of said plurality of IP subnetworks;

assembling said plurality of objects describing said at least one of said plurality of IP subnetworks into a management information base (MIB), said MIB cooperating with said plurality of forwarding policies;

forming said at least one of said plurality of IP subnetworks by dynamically creating a routing table using said MIB and said forwarding policies; and managing said at least one of said plurality of IP subnetworks from said management station using said assembled MIB and said plurality of forwarding policies by monitoring performance of said at least one of said plurality of IP subnetworks.

7. The method of claim 6, wherein said MIB resides in digital subscriber line (DSL) remote terminal unit.

8. The method of claim 6, wherein said MIB resides in a digital subscriber line (DSL) central office unit.

9. The method of claim 6, wherein said step of forming said at least one of said plurality if IP subnetworks is performed automatically from a central office location to a plurality of DSL remote terminal unit.

10. The method of claim 6, wherein said step of forming said at least one of said plurality of IP subnetworks by creating a routing table further includes the step of updating an IP address table.

11. A management information base (MIB) which uses a management application program running on a management station, for implicitly of contiguous and discontiguous Internet Protocol (IP) subnetworks in a digital subscriber line (DSL) remote terminal unit, using a plurality of forwarding policies, the MIB comprising:

a plurality of objects describing at least one of said plurality of IP subnetworks;

means for dynamically assembling said plurality of objects describing said at least one of said plurality of IP subnetworks into a management information base (MIB); and means for managing said at least one of said plurality of IP subnetworks from said management station using said assembling MIB by monitoring performance of said at least one of said plurality of IP subnetworks.

12. A computer readable medium having a program, which uses a management application program running on a management station, for implicitly supporting a plurality of contiguous and discontinuous Internet Protocol (IP) subnetworks using a plurality of forwarding policies, the MIB comprising:

a plurality of objects describing at least one of said plurality of IP subnetworks;

means for dynamically assembling said plurality of objects describing said at least one of said plurality of IP subnetworks into a management information base (MIB); and means for managing said at least one of said plurality of IP subnetworks from said management station using said assembled MIB by monitoring performance of said at least one of said plurality of IP subnetworks.

13. A computer readable medium having a program for implicitly supporting a plurality of contiguous and discontinuous Internet Protocol (IP) subnetworks using a plurality of forwarding policies and a management application running on a management station, the program comprising:

means for collecting a plurality of objects describing at least one of said plurality of IP subnetworks;

means for assembling said plurality of objects describing said at least one of said plurality of IP subnetworks into a management information base (MIB), said MIB cooperating with said plurality of forwarding policies;

means for forming said at least one of said plurality of IP subnetworks by dynamically creating a routing table using said MIB and said forwarding policies; and means for managing said at least one of said plurality of IP subnetworks from said management station using said assembled MIB and said plurality of forwarding policies by monitoring performance of said at least one of said plurality of IP subnetworks.

14. A system for implicitly supporting a plurality of continuous and discontinuous Internet Protocol (IP) subnetworks using a plurality of forwarding policies and a management application running on a management station, comprising:

memory containing logic configured to collect a plurality of objects describing at least one of said plurality of IP subnetworks;

memory containing logic designed to assemble said plurality of objects describing said at least one of said plurality of IP subnetworks into a management information base (MIB), said MIB cooperating with said plurality of forwarding policies;

logic designed to form said at least one of said plurality of IP subnetworks by dynamically creating a routing table using said MIB and said forwarding policies; and logic designed to manage said at least one of said plurality of IP subnetworks from said management station using said assembled MIB and said plurality of forwarding policies by monitoring performance of said at least one of said plurality of IP subnetworks.

\* \* \* \* \*

UNITED STATES PATENT AND TRADEMARK OFFICE
CERTIFICATE OF CORRECTION

PATENT NO.    : 6,085,245			Page 1 of 1
DATED         : July 24, 1997
INVENTOR(S)   : Kayces, et al.

It is certified that error appears in the above-identified patent and that said Letters Patent is hereby corrected as shown below:

Column 3,
Line 2, after "item" insert -- may be retrieved by a --.

Column 7,
Line 20, delete "#2is" and substitute therefor -- #2 is --.
Line 28, delete "#3is" and substitute therefor -- #3 is --.
Line 32, delete "#4is" and substitute therefor -- #4 is --.
Line 43, after "MIB" start a new paragraph beginning with the word "With".

Column 8,
Line 38, delete "0.0.0.0and" substitute therefore -- 0.0.0.0 and --.

Column 12,
Line 23, after "implicity" add -- supporting a plurality of --.

Signed and Sealed this

Fourteenth Day of August, 2001

*Attest:*

*Nicholas P. Godici*

*Attesting Officer*

NICHOLAS P. GODICI
*Acting Director of the United States Patent and Trademark Office*